United States Patent Office 2,704,363
Patented Mar. 15, 1955

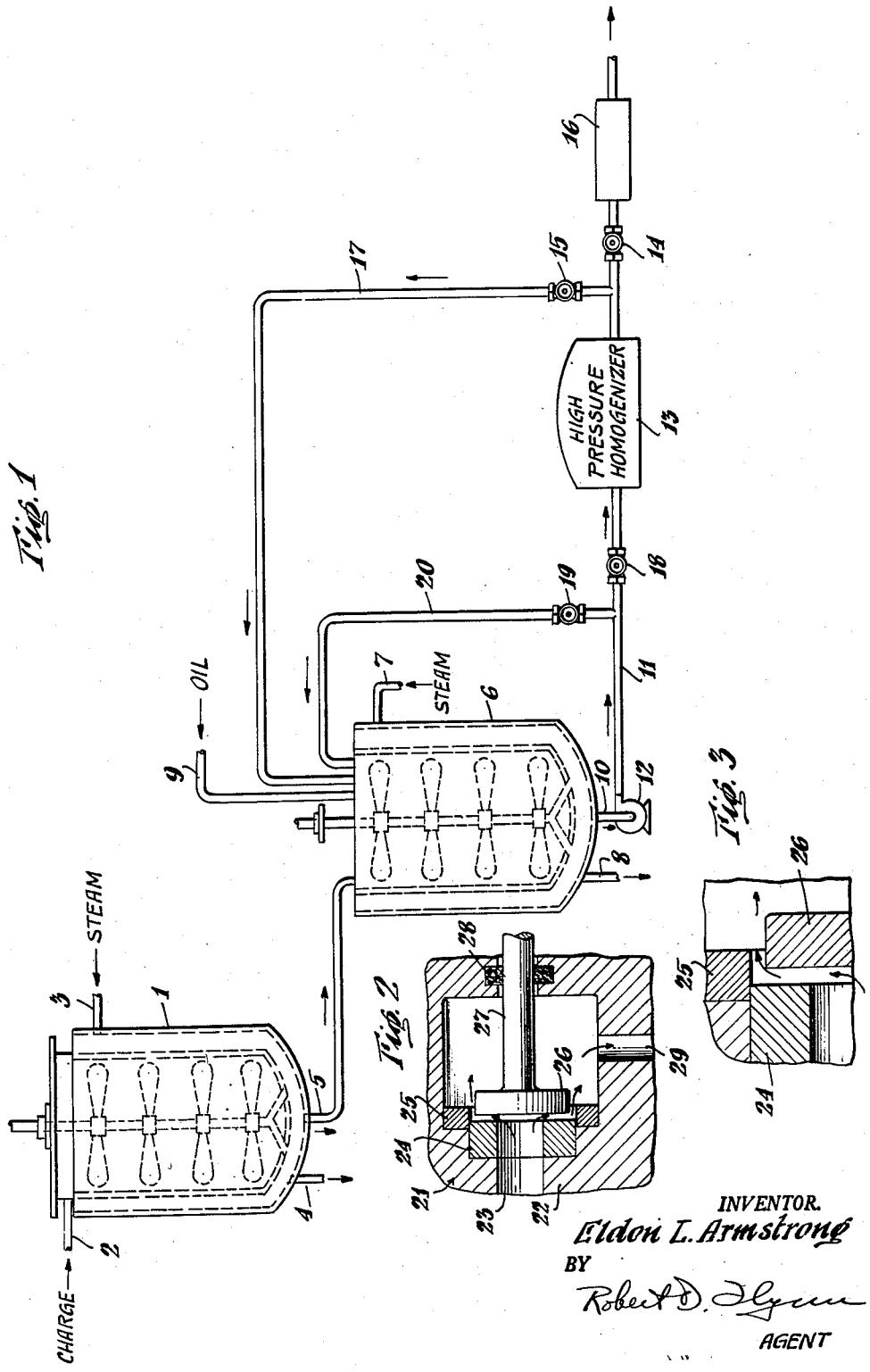

2,704,363

GREASE MANUFACTURE

Eldon L. Armstrong, Garden City, N. Y., assignor to Socony-Vacuum Oil Company, Incorporated, a corporation of New York Application June 14, 1954, Serial No. 436,508

20 Claims. (Cl. 252—28)

This invention relates to an improved method for the manufacture of lubricating greases. More particularly, the present invention is directed to a novel process for preparing a grease composition by the use of a high pressure homogenizer.

This application is a continuation-in-part of my application Serial No. 153,157, filed March 31, 1950, now abandoned.

It has heretofore been known in the manufacture of greases to employ various types of mixing and milling equipment for combining the raw materials, for smoothing the grease texture, for incorporating additive materials into the grease and for a number of other purposes. Simple mixing of the grease ingredients is usually carried out at atmospheric pressure. Milling of the grease is generally accomplished at pressures in excess of atmospheric. Even under the most severe milling conditions, however, the grease undergoing treatment is rarely subjected to pressures greater than 200 pounds per square inch. The resulting milled grease, moreover, has a consistency appreciably less than that of the unmilled grease.

In accordance with the present invention, it has now been found that by homogenizing a grease under pressures greater than about 500 pounds per square inch and thereafter suddenly releasing the grease from said high pressure to a lower pressure atmosphere, the resulting grease composition has appreciably improved physical properties, particularly in regard to the consistency of the product so obtained.

It would appear that the improved characteristics of the homogenized grease are due to an internal shear or bombardment within the product which tends to break down the particle size thereof. When the grease is suddenly released from high pressure to a lower pressure in accordance with the procedure described herein, there is an explosive factor which, combined with the shattering effect of discharging the grease through a restricted orifice tends to disintegrate the larger globules of grease into minute particles.

The principles of the present invention are subject to wide application and may be employed in improving the characteristics of any of the conventional greases, including alkali metal base greases, alkaline earth metal base greases, aluminum base greases, mixed base greases, etc.

The homogenizer used in treating greases in accordance with the instant invention may be any of those homogenizers capable of developing a pressure in excess of 500 pounds per square inch wherein the product is subjected to high shearing action upon release of said pressure. Typical of the homogenizers which may be employed in the present process are those of the type conventionally used in the homogenization of dairy products and in the preparation of emulsions utilized as polishing compounds, cosmetics, pharmaceuticals, liquid soaps, and the like. These homogenizers, such as the Manton-Gaulin homogenizer and others, are well known in the art and accordingly need not be described in detail here.

The desired homogenization may be accomplished at various points in grease processing, it being only necessary in achieving the improved results of the present process that one or more thickening or gelling agents conventionally employed in grease-making, such as soaps, organophilic clays, organophilic inorganic oxides, inorganic oxide gelling agents, and the like, be present in the mixture. For example, the grease undergoing homogenization may be an otherwise finished grease. Passage of such grease compositions through a homogenizer under a pressure in excess of 500 p. s. i. has, as will be shown below, been found to result in a marked improvement in the consistency of the resulting grease. It is also within the purview of this invention to feed an oil stream and a metal soap to a high pressure homogenizer and to thereby obtain a high quality finished grease composition. Likewise, the present invention contemplates improvement of any lubricant thickened with a soap or other gelling agent partially or completely processed by passage of the same through a high pressure homogenizer.

A preferred embodiment of the present invention is to employ a high pressure homogenizer in conjunction with a steam kettle. As pointed out hereinabove, greases homogenized by the method of this invention are characterized by an improved body, and an improved mechanical stability. Certain greases, notably lithium base greases, soda-lime mixed base greases, soda greases prepared from high titer fats and other greases requiring heat for dispersion heretofore have necessarily been prepared under high temperature conditions in order that the resulting grease possess essential body and have desired high melting point characteristics. Greases of the foregoing class accordingly have heretofore necessarily been produced by fire-cooking at temperatures above 325–350° F. Greasemakers have thus heretofore been unable to produce these greases by steam-cooking since the temperatures thereby attained were not sufficient to impart the desired body to the final grease.

It has now been discovered that the above greases may be produced in steam kettles, providing that the steam-cooked grease mixture is thereafter passed through a high pressure homogenizer operating at a pressure in excess of 500 pounds per square inch. The added body imparted to the grease upon passage through the high pressure homogenizer is sufficient to bring the consistency thereof up to the level normally experienced when using a fire-heated grease kettle. Thus, with the use of a high pressure homogenizer, the manufacture of greases can be accomplished at temperatures substantially lower than those commercially used in fire-heated grease kettles.

The importance of the foregoing embodiment of this invention is evident when it is considered that the majority of grease plants in the United States are not equipped with fire kettles or other means for heating the contents of grease kettles to a temperature above 325–350° F. Steam, on the other hand, is the predominant heating medium in grease plants. Hence, the addition of a high pressure homogenizer in accordance with the procedure of this invention converts the grease plant from one making cup greases and other conventional grease products not requiring high temperatures to an all-purpose grease plant capable of producing all kinds of greases including the high temperature block greases and ball-bearing greases.

A further added, but highly important, advantage in the introduction of a high pressure homogenizer and the elimination of the fire kettle is the prevention of fire hazards. Under the novel method of manufacture set forth herein, the greases are generally prepared at temperatures not exceeding the flash point of the oil components.

Moreover, it is to be realized that the increase in grease consistency effected by the use of a high pressure homogenizer is in fact equivalent to a saving in the content of soap or other gelling agent. Thus, to produce a grease of a given hardness, a lesser amount of thickening or gelling agent may be employed with the use of a high pressure homogenizer than is necessary in the absence of such homogenization.

A suitable apparatus setup for effecting the process of this invention is shown in Figure 1 attached hereto. Referring more particularly to Figure 1, it will be seen that a charge of oil and thickening agent, or the ingredients for making the same is conducted into a pressure kettle 1 through conduit 2. The kettle is heated by steam which is introduced through pipe 3 and withdrawn through pipe 4. After saponification and/or admixture of the ingredients is achieved, the resulting stock is blown over by pressure through conduit 5 into an open finishing kettle 6 which is heated by means of steam introduced through pipe 7 and withdrawn through pipe 8. Cut-back oil is conducted into the finishing kettle through pipe 9. After thorough agitation of the mixture, the kettle contents are withdrawn through outlet conduit 10 and pumped through pipe 11 by pump 12 and then passed through a high pressure homogenizer 13, which is described in greater detail hereinbelow in connection with Figures 2 and 3, attached hereto. By proper manipulation of valves 14 and 15, the homogenized grease may thereafter either be conducted through filter 16 and then to packaging or, if more than one pass through the homogenizer is deemed advisable, the grease may be recycled through conduit 17 back into the finishing kettle. Likewise, by proper manipulation of valves 18 and 19, the grease may be recycled back into the finishing kettle via conduit 20 prior to passage through the high pressure homogenizer.

Figures 2 and 3 are sectional views of simplified representations of valve assembly 21 of homogenizer 13. As shown in Figure 2, valve assembly 21 comprises casing 22, product inlet 23, seat ring 24, impact ring 25, valve head 26 which is part of valve rod 27, packed by packing 28, and product outlet 29.

Figure 3 illustrates, in highly exaggerated form, the section of valve assembly 21 defined by seat ring 24, impact ring 25 and valve head 26.

In operation of the valve assembly 21, grease from line 11 and valve 18 flows through product inlet 23 and flows by seat ring 24. The grease then flows through the orifice defined by seat ring 24 and valve head 26, thence through the orifice defined by impact ring 25 and valve head 26, to the space within casing 22 around valve rod 27, and flows out through product outlet 29. It will be understood that the orifice defined by seat ring 24 and valve head 26, can be adjusted to size as desired, by suitable setting of valve rod 27. Similarly, the orifice defined by impact ring 25 and valve head 26 can be adjusted by corresponding adjustment of valve rod 27 or by suitable replacement of valve head 26 by another such head of prescribed dimensions.

Inasmuch as it is advantageous, as explained hereinbelow, to have an impact ring (25) as an integral part of valve assembly 21, the latter is so illustrated in Figures 2 and 3. However, it is to be understood that impact ring 25 can be omitted from the assembly without material loss of the benefits realized by this invention.

As grease flows from product inlet 23, which is a high pressure zone, to product outlet 29, which is a zone of substantially lower pressure than 23, it passes through the aforesaid restricted orifices whereupon the thickening agent present in the grease is disintegrated into minute particles and is dispersed thoroughly throughout the grease. Additionally, the thickening agent of the grease is believed to shatter when it comes into contact with impact ring 25 and/or the inner wall of casing 21, the ring and casing wall serving as impingement surfaces.

Experimentation has shown that a suitably selected and located impact ring may reduce the homogenization pressure required to obtain a given efficiency of operation. For example, without an impact ring, 6000–7000 pounds pressure was required in the sump chamber to obtain a grease with satisfactory structure and consistency using an organophilic clay thickener. With a suitable impact ring, the pressure could be reduced to 4500–5500 pounds for equally satisfactory results.

The relative area of the passage between seat ring 24 and valve head 26 is dependent upon the volume and nature of the grease being handled and upon the degree of homogenization desired, and the valve is therefore adjustable to secure desired operating conditions.

Having described in a general way the nature of this invention, the following specific examples will serve to illustrate the advantages to be obtained in accordance with the procedure of this invention.

EXAMPLE 1

A mixed lithium, calcium, and sodium base grease was prepared according to the following formula:

Per cent by weight
Lithium stearate _____ 8.00
Calcium stearate _____ 2.00
Caustic soda _____ 0.13
12-hydroxy stearic acid _____ 1.00
Oxidation inhibitor (1.25% barium salt of diwax benzene sulfonic acid+0.2% phenyl alpha-naphthylamine) _____ 1.45
300 sec. at 100° F. S. U. V. mineral oil _____ 87.42

The above formula was used for making two batches of grease, one by conventional fire kettle cooking and the other by cooking in a steam kettle followed by passage through a high pressure homogenizer.

The grease prepared by fire kettle cooking was made by charging a fire kettle with 50 per cent of the mineral oil, the hydroxy stearic acid and a 50 per cent by weight aqueous solution of the caustic soda. Thereafter, the paddles of the grease kettle were set into motion and the temperature of the kettle was slowly raised. After agitating the above mixture for about 5 minutes, the dry lithium and calcium stearates were charged to the kettle. The temperature was then increased to 370–390° F. and the balance of the mineral oil and the oxidation inhibitor were added. The resulting mixture was then heated to a temperature of 400–420° F. for a period of 30–40 minutes and then drawn into cooling pans. After the product was cooled to room temperature, which usually took 10–12 hours, the grease blocks were transferred to a milling kettle and the grease was milled until the ASTM worked and unworked penetration were essentially the same value. The resulting grease was thereafter conducted into shipping containers.

The grease prepared by steam kettle cooking and high pressure homogenization was made by charging a steam kettle with 50 per cent of the mineral oil, the hydroxy stearic acid and a 50 per cent by weight aqueous solution of the caustic soda. The paddles of the kettle were set into motion and steam pressure was charged to the jacket of the kettle, raising the temperature to 250° F. After the above mixture was agitated for about 5 minutes, the dry lithium and calcium stearates were charged to the kettle. Thereafter, the system was maintained at a temperature of 290–320° F. and evacuated to under ten inches of mercury for a period of one hour. Then the vacuum was reduced to atmospheric pressure and the kettle opened. The mixture was pumped from the bottom of the kettle, passed through a high pressure homogenizer operated at a pressure of 2000–3000 pounds per square inch and then led back into the top of the kettle. During the homogenization, the balance of the mineral oil and the oxidation inhibitor were added and the jacket temperature of the kettle was reduced to about 250° F. by cooling with water. The homogenization of the grease was continued for 1 to 1½ hours. The resulting grease was thereafter conducted into shipping containers at a temperature of 200–220° F.

The comparative properties of the grease produced by conventional fire kettle cooking and by steam kettle cooking plus homogenization are set forth in the following table:

| | Fire Kettle | Steam Kettle plus High Pressure Homogenization |
|---|---|---|
| ASTM Worked Penetration | 327 | 305 |
| Decrease in Consistency (points softening as measured by the Shell Roll Test) | 27 | 12 |
| ASTM Dropping Point _____° F__ | 358 | 370 |
| Manufacturing Temperature _____do____ | 400 | 320 |
| Cooking Time _____hours__ | 3 | 2 |
| Cooling Time _____do____ | 10 | 1½ |
| Milling Time _____do____ | 5 | 0 |
| Total Hours for Mfg. | 18 | 3½ |

It will be noted from the foregoing table that the grease prepared by steam kettle cooking and homogenization had an improved consistency over the grease prepared by conventional fire kettle cooking, as indicated by the ASTM worked penetration test. The homogenized grease also possessed greater mechanical stability as indicated by the smaller decrease in consistency when subjected to the shell roll test. The description of this test is set forth in detail in the Institute Spokesman, volume VI, No. 12, page 1, March 1943. It is to be further noted that the operating temperatue of the novel process was 320° F. as compared with a temperature of 400° F. required in the conventional fire-cooking procedure. It is still further to be noted that the total operating time was reduced from a total of 18 hours in the conventional fire-cooking process to 3½ hours for the steam-cooking and homogenization procedure of this invention.

EXAMPLE 2

This example serves to illustrate the effect of high pressure homogenization on a conventional lime base cup grease. The formula for this product was as follows:

| | Per cent by weight |
|---|---|
| 100 sec. at 100° F. S. U. V. mineral oil | 82.2 |
| Tallow | 13.8 |
| Cottonseed fatty acids | 1.7 |
| Lime flour | 2.3 |
| Water | +1.5 |

The grease was prepared by charging a pressure kettle with approximately 7 per cent of the mineral oil, tallow, cottonseed fatty acid, and lime. A small amount of water (3.6 per cent of pressure kettle charge) was added to the kettle charge in order to obtain pressure within the closed vessel. Thereafter, the pressure kettle was closed, the steam turned on and saponification effected over a period of three hours, the final pressure and temperature of the charge before blowover into the finishing kettle being 60–80 pounds per square inch and 300–320° F., respectively.

The procedure subsequently followed depended on whether the conventional or shorter time methods were followed. These methods are described in detail below:

*Conventional method*

During saponification, a second open kettle was charged again with approximately 7 per cent of the total mineral oil and heated to 180–200° F. After the above described saponification was complete, the soap stock was blown over into the mineral oil in the open kettle. The paddles of this kettle were then set in motion and the mixture was thoroughly agitated. This mixture was then cooked for one hour at temperatures in the range of 270 to 300° F. The remaining oil was then added, the initial rate of oil feed being relatively slow. After approximately 50–60 per cent of the total remaining mineral oil has been run into the kettle, the circulating return grease line, which circulated the grease from the bottom to the top of the kettle, was turned on. The temperature of the grease was in the range of 180–200° F. after all the mineral oil had been finally added. The time required for this particular stage of the processing was 5.5 hours. Any adjustments required to obtain the desired consistency range and/or water content of the grease were then made by either adding additional oil or water, respectively.

*Shorter time methods*

During saponification, a second open kettle was charged with 38–40 per cent of the total mineral oil and heated to 200–240° F. The circulating grease line, which circulated the oil from the bottom to the top of the kettle, was turned on. After the above described saponification was complete, the soap stock was blown over into the mineral oil in the open kettle, the maximum temperature of the kettle charge never going above 245° F. in temperature. In the batch where the homogenizer was used, the oil grease mixture was pumped from the bottom of the kettle through the grease circulating line to the homogenizer, which was operated at 2,000 p. s. i., and overhead to the top of the kettle. The remaining oil was then added as quickly as possible. The temperature of the grease was in the range of 180–200° F. after all the mineral oil had been added. The time required for this particular stage of the processing was approximately 1.3 hours. Any adjustments required to obtain the desired consistency range and/or water content of the grease were then made by either adding additional oil or water, respectively.

The resulting homogenized grease was compared with a sample of commercial lime grease of equivalent soap content which was prepared by the conventional method set forth above, which did not include homogenization. For further comparative purposes, data were obtained on a batch which was prepared in essentially the same manner as the homogenized grease with the exception that the homogenizer was not employed. The results of said comparisons are set forth in the table below:

*NLGI Grade 3 cup grease*

| Method | Conventional | Shorter Time Method with Homogenizer | Shorter Time Method without Homogenizer |
|---|---|---|---|
| Percent Soap Content As Calcium Soap | 16.5 | 16.5 | 16.5 |
| Total Batch Time: | | | |
| Soap Saponification,[1] Hours | 3 | 3 | 3 |
| Finishing Kettle, Hours | 5.5 | 1.3 | 1.3 |
| Consistency Adjustment [1] | 2.0 | 2.0 | 2.0 |
| | 10.5 | 6.3 | 6.3 |
| ASTM Worked Penetration: | | | |
| At Time of Manufacture | 245 | 223 | 290 |
| After 3 Months' Storage | 254 | 236 | 295 |

[1] Should be about the same regardless of Process (average time periods reported).

From the foregoing table, it will be seen that the homogenized grease was some 20 points heavier in consistency than the grease prepared in the conventional manner and some 65 points stiffer than the grease prepared by the shorter time method which did not include the homogenizer. Moreover, the stability of the homogenized grease after three months' storage was at least equivalent to that of the conventional commercial product.

EXAMPLE 3

This example shows the effect of high pressure homogenization on a lime base grease. The formula for this product was as follows:

| | Per cent by weight |
|---|---|
| 100 sec. at 100° F. S. U. V. mineral oil | 84 |
| Regular tallow | 14 |
| Lime flour | 2 |
| Water | +1.5 |

The grease was prepared by charging a pressure kettle with 50 per cent of the mineral oil, tallow and an oil-lime slurry. A small amount of water (0.75%) was added to the kettle charge in order to obtain pressure within the closed vessel. Thereafter, the pressure kettle was closed, the steam turned on and saponification effected over a period of 1½ to 2 hours at 60 pounds' kettle pressure and a temperature of 300–320° F. During the above interval, a second open kettle was charged with the balance of the mineral oil and heated to 180–200° F. After the above described saponification was complete, the soap stock was blown over into the mineral oil in the open kettle. The paddles of this kettle were then set into motion and the mixture was thoroughly agitated. The kettle contents were then passed through a high pressure homogenizer operated at a pressure of 3000 p. s. i. and then led back into the kettle. During the foregoing homogenization, 0.75 per cent of water was added to the grease.

The resulting homogenized grease was compared with a sample of commercial lime grease of equivalent soap content which had not undergone homogenization. The results of said comparison are set forth in the table below:

*NLGI Grade 2 Cup grease*

| Product | Percent Soap Content as Calcium Soap | ASTM Worked Penetration | | Appearance of Grease After 4 Months' Storage | Socony-Vacuum Separability Test—Percent Oil Separation After 100 Hrs. |
| --- | --- | --- | --- | --- | --- |
| | | Orig. Grease | After 4 Months' Storage | | |
| Non-Homogenized Grease | 14 | 314 | 307 | Trace of Separated Oil. | 11.2 |
| Homogenized Grease | 14 | 284 | 283 | ____do____ | 10.7 |

From the foregoing table, it will be seen that the homogenized grease was 30 points heavier in consistency than the non-homogenized grease, as measured by the ASTM Work Penetration Test. Moreover, the stability of the homogenized grease after four months' storage was at least equivalent to that of the non-homogenized product. The homogenized grease further showed less tendency towards oil separation than the non-homogenized grease, as indicated by the Socony-Vacuum Separability Test described in the Institute Spokesman, volume IX, No. 2, page 1, May 1945. It is also to be noted that the above comparative data were obtained on a product which had been passed through the homogenizer only once. It was observed that additional gain in consistency could be obtained by passing the grease through the high pressure homogenizer several times. For example, it was found that the homogenized grease, after 5 passes through the high pressure homogenizer, had an ASTM work penetration of 269. After 4 months' storage, the consistency of this grease was 271 and it showed 9.2 per cent oil separation after a 100-hour test.

It is apparent from these results that while distinct improvement is obtained by a single pass of the soap-containing grease mixture through a high pressure homogenizer, still further improvements may be realized by a repeated number of such passes. The present invention, accordingly, contemplates procedures wherein the grease mixture is passed through a high pressure homogenizer any number of times consistent with the economics of the process and with the desired characteristics of the final grease.

As pointed out hereinabove, it is only necessary in achieving the improved results of this invention that a thickening or gelling agent admixed with oil be present in the grease mixture undergoing homogenization. Thus, in addition to the customary soap-thickened greases, lubricant mixtures thickened with organophilic clays, organophilic inorganic oxides, inorganic oxide gelling agents, and other oil-gelling agents well known to the art may be improved by high pressure homogenization of the same in accordance with the instant process. The following examples serve to illustrate the effect of high pressure homogenization on greases prepared from gelling agents other than metallic soaps.

EXAMPLE 4

This example shows the results achieved by subjecting an organophilic clay type grease to high pressure homogenization. The formula for this product was as follows:

Per cent by weight
Bentone 34 _____ 10
100 sec. at 100° F. S. U. V. mineral oil _____ 90

Bentone 34 is the reaction product of purified bentonite and a quaternary ammonium salt. The organic radical of the salt replaces the sodium in the bentonite. This results in the conversion of the bentonite from a hydrophilic to an organophilic material. Such organophilic bentonites have been described by J. W. Jordan in The Journal of Physical and Colloid Chemistry, vol. 53, No. 2, 1949.

Intimate mixing of the treated bentonite and mineral oil by stirring vigorously for one-half hour gave a slurry which was unstable, the bentonite particles tending to settle on standing. Subsequent passage of this slurry through a high pressure homogenizer resulted in the formation of a comparatively stable material having a grease-like structure. In this instance, the homogenizer was operated at a pressure of 1000 pounds per square inch and at at temperature in the range of 130 to 150° F. The properties of the resulting grease were as follows:

ASTM penetration at 77° F.:
   Unworked _____ 336
   Worked _____ 362
ASTM dropping point, ° F. _____ 500+

EXAMPLE 5

This example shows the results achieved by subjecting an oil-dispersible inorganic oxide gel type grease to high pressure homogenization. The formula for this product was as follows:

Per cent by weight
Coated Silica 30 _____ 10
100 sec. at 100° F. S. U. V. mineral oil _____ 90

Coated Silica 30 is an ultra finely divided grade of silica gel, surface coated with a water repellent siloxane. Thus, Coated Silica 30 is typical of organophilic inorganic oxides.

The above formula was used for making two batches of grease, one by conventional mixing of the silica and oil and the second by subjection of the silica-oil mixture to high pressure homogenization.

The first of the above batches was prepared by vigorous agitation of the silica and oil for a period of 4 to 5 hours at a temperature of about 80° F. The second batch was prepared by passage of the silica and oil mixture through a high pressure homogenizer operating at a pressure of about 800 pounds per square inch and at a temperature of about 80° F. The total time required for manufacture of the grease in this fashion was about 50 minutes.

The worked ASTM penetration at 77° F. of the homogenized grease was 361, whereas the batch prepared by considerably longer working at high speed agitation had an ASTM work penetration of 371. The method of this invention accordingly provides a more rapid procedure for making greases of improved consistency as compared with conventional method heretofore employed.

The content of soap or other gelling agent in the grease mixture undergoing homogenization may vary widely, depending upon the particular type of grease being treated and upon the particular state of processing in which it is found. As has been pointed out hereinabove, it is only necessary in securing the benefits of the instant invention that at least some soap or other gelling agent be present in the mixture being subjected to homogenization. Ordinarily, however, the content of soap or other gelling agent present in mixtures treated by the process described herein will generally be between 2 and about 60 per cent by weight.

The pressure applied during homogenization is in excess of about 500 pounds per square inch and ordinarily is within the range of about 1500 to about 7500 pounds per square inch, although pressures up to and exceeding 10,000 pounds per square inch may be employed with advantage in some instances. The optimum pressure for any particular grease will, of course, vary, depending upon such factors as temperature during homogenization, content of gelling agent present in the mixture being treated and nature of the soap or other gelling agent employed in preparing the grease. Thus, for a lime base cup grease having an approximate soap content of 14 per cent by weight, undergoing homogenization at a temperature of 85–125° F., a variation in pressure modified in the consistency characteristics of the resulting homogenized grease in accordance with the following table:

| Pressure (p. s. i.) | ASTM Worked Penetration of Homogenized Grease | Decrease in ASTM Worked Penetration |
| --- | --- | --- |
| 0 | 285 | |
| 500 | 272 | 13 |
| 1,000 | 264 | 21 |
| 1,500 | 257 | 28 |
| 3,000 | 252 | 33 |
| 6,000 | 250 | 35 |

These results indicate that for the particular grease undergoing treatment, the optimum pressure was about 3000 pounds per square inch.

The temperature at which homogenization of the grease mixture is effected will likewise vary widely, depending largely upon the type and character of the mixture undergoing treatment. Thus, the temperature may vary from room temperature up to the melting point of the particular grease composition under homogenization. Generally, it has been found desirable to work at temperatures within the approximate range of 150° F. to 300° F., although such range is not a restrictive feature of the present process.

Although the invention has been illustrated hereinabove by mineral oil vehicles, it is to be understood that other oleaginous vehicles can also be used in this new manufacturing technique. In place of all or part of the mineral oil vehicle, other oils of lubricating viscosity can be used. Such oils include synthetic vehicles comprising polymerized olefins, esters of various dibasic acids, esters of polyalcohols and monocarboxylic acids, silicones, silicate esters, esters of phosphorus-containing acids, fluorocarbons, perfluoroalkyl ethers, perfluoroalkyl amines, etc. Typical of such synthetic oils are: polypropylene, polypropylene glycol, di-(2-ethyl hexyl) sebacate, di-(2-ethyl hexyl) adipate, dibutyl phthalate, polyethylene glycol di-(2-ethyl hexoate), polymethylsiloxane. The synthetic vehicles are most suitable for providing greases for use in aircraft, since many of the greases retain their lubricating value over a wide temperature range, from about −100° F. to about 500° F. In general, the mineral oils and synthetic lubricants which can be used herein are characterized by a viscosity (S. U. V.) of greater than about 40 seconds at 100° F., preferably from about 60 to about 6000 seconds at 100° F.

While the nature of this invention has been described in considerable detail and various illustrations have been given for improved procedures for the preparation of specific grease compositions, it is to be understood that the invention in its broader aspects is not limited thereto but includes numerous modifications and variations of high pressure homogenization of grease mixtures as set forth in the appended claims.

I claim:

1. In the manufacture of a lubricating grease, the steps which comprise: forming a mixture of a mineral oil and a thickening agent whose crystalline structure has been established before subsequent homogenization, the thickening agent being present in an amount sufficient to thicken said oil to a grease; homogenizing the resulting grease by subjecting the same to a pressure greater than about 500 pounds per square inch, and thereafter suddenly releasing the grease so compressed to a zone of substantially lower pressure by discharge thereof through a restricted orifice, whereupon the thickening agent is disintegrated into minute particles, which are thoroughly dispersed throughout the grease.

2. In the manufacture of a lubricating grease, the steps which comprise: forming a mixture of a mineral oil and a thickening agent whose crystalline structure has been established before subsequent homogenization, the thickening agent being present in an amount sufficient to thicken said oil to a grease; homogenizing the resulting grease by subjecting the same to a pressure within the range of about 1500 to about 7500 pounds per square inch, and thereafter suddenly releasing the grease so compressed to a zone of substantially lower pressure by discharge thereof through a restricted orifice, whereupon the thickening agent is disintegrated into minute particles, which are thoroughly dispersed throughout the grease.

3. In the manufacture of a lubricating grease, the steps which comprise: forming a mixture of a mineral oil and an organophilic clay, the latter being present in an amount sufficient to thicken said oil to a grease; homogenizing the resulting grease by subjecting the same to a pressure greater than about 500 pounds per square inch, and thereafter suddenly releasing the grease so compressed to a zone of substantially lower pressure by discharge thereof through a restricted orifice, whereupon the clay thickening agent is disintegrated into minute particles, which are thoroughly dispersed throughout the grease.

4. In the manufacture of a lubricating grease, the steps which comprise: forming a mixture of a mineral oil and an oil-dispersible inorganic oxide, the latter being present in an amount sufficient to thicken said oil to a grease; homogenizing the resulting grease by subjecting the same to a pressure greater than about 500 pounds per square inch, and thereafter suddenly releasing the grease so compressed to a zone of substantially lower pressure by discharge thereof through a restricted orifice, whereupon the oil-dispersible inorganic oxide thickening agent is disintegrated into minute particles, whch are thoroughly dispersed throughout the grease.

5. In the manufacture of a lubricating grease comprising mineral oil and a soap gelling agent, wherein a mineral oil and said soap gelling agent are mixed to form a grease structure before subsequent homogenization, said agent being present in sufficient amount to thicken said oil to a grease, the step which comprises: homogenizing the grease by subjecting the same to a pressure greater than about 500 pounds per square inch, and thereafter suddenly releasing the grease so compressed to a zone of substantially lower pressure by discharge thereof through a restricted orifice, whereupon the gelling agent is dispersed through said grease in particles of much smaller dimension than before homogenization.

6. In the manufacture of a lubricating grease, the steps which comprise: forming a mixture of a mineral oil and a thickening agent whose crystalline structure has been established before subsequent homogenization, the thickening agent being present in an amount sufficient to thicken said oil to a grease; homogenizing the resulting grease by subjecting the same to a pressure greater than about 500 pounds per square inch, and thereafter suddenly releasing the grease so compressed to atmospheric pressure by discharge thereof through a restricted orifice, whereupon the thickening agent is disintegrated into minute particles, which are thoroughly dispersed throughout the grease.

7. In the manufacture of a lubricating grease, the steps which comprise: forming a mixture of a mineral oil and a thickening agent whose crystalline structure has been established before subsequent homogenization, the thickening agent being present in an amount suffiicent to thicken said oil to a grease; homogenizing the resulting grease by subjecting the same to a pressure within the range of about 1500 to about 7500 pounds per square inch, and thereafter suddenly releasing the grease so compressed to atmospheric pressure by discharge thereof through a restricted orifice, whereupon the thickening agent is disintegrated into minute particles, which are thoroughly dispersed throughout the grease.

8. A method for improving the consistency of a grease having a gelling agent content of between about 2 and about 60 per cent by weight, which comprises subjecting said grease to homogenization at a pressure between about 1500 and about 7500 pounds per square inch and thereafter effecting an intimate internal shear of the grease so treated by sudden expulsion thereof through a restricted orifice to substantially atmospheric pressure, whereupon the gelling agent is dispersed through said grease in particles of much smaller dimension than before homogenization.

9. A method for imparting greater body to a grease comprising a mineral oil and a thickening agent whose crystalline structure has been established before subsequent homogenization, which comprises introducing the same into a high pressure homogenizer operating at a pressure in excess of 500 pounds per square inch and thereafter suddenly expelling said grease from said high pressure homogenizer through a restricted orifice, whereupon the thickening agent is dispersed through said grease in particles of much smaller dimension than before homogenization.

10. A process for producing lubricating greases, which comprises feeding a gelling agent whose crystalline structure has been established before subsequent homogenization and an oil stream into a high pressure homogenizer operating at a pressure greater than about 500 pounds per square inch, the proportion of gelling agent and oil being such that the combination thereof results in a grease, subjecting the resulting mixture to homogenization at a pressure in excess of 500 pounds per square inch and thereafter suddenly releasing the grease from said high pressure by expulsion thereof through a restricted orifice, whereupon the gelling agent is dispersed through said grease in particles of much smaller dimension than before homogenization.

11. A process for producing lubricating greases, which comprises feeding a metal soap whose crystalline structure has been established before subsequent homogenization and an oil stream into a high pressure homogenizer operating at a pressure in the range of about 1500 to about 7500 pounds per square inch, the proportion of soap and oil being such that the combination thereof results in a grease having a soap content of between about 2 and about 60 per cent by weight, subjecting the resulting mixture to homogenization at a pressure within the foregoing range and thereafter suddenly releasing the grease composition from said high pressure by expulsion thereof through a restricted orifice to substantially atmospheric pressure, whereupon the soap is dispersed throughout said grease in particles of much smaller dimension than before homogenization.

12. A process for manufacturing lubricating greases, which comprises mixing mineral oil, a saponifiable fatty material and alkali in a heated kettle, cooking the resulting mixture until saponification of siad fatty material is complete, and a soap grease structure is formed before subsequent homogenization, passing the grease mixture so formed in to a high pressure homogenizer at a pressure in excess of 500 pounds per square inch and thereafter suddenly releasing the grease from said high pressure to substantially lower pressure by expulsion thereof through a restricted orifice, whereupon the soap is dispersed throughout said grease in particles of much smaller dimension than before homogenization.

13. A process for manufacturing a grease containing lithium soap, which comprises cooking a lithium soap and mineral oil to form a soap grease structure before subsequent homogenization, passing the resulting grease mixture into a high pressure homogenizer at a pressure in excess of 500 pounds per square inch and thereafter effecting an intimate internal shear of the grease by sudden expulsion thereof from said high pressure through a restricted orifice to substantially atmospheric pressure, whereupon the soap is dispersed throughout said grease in particles of much smaller dimension than before homogenization.

14. In the manufacture of a grease in which the major soap component is a lithium soap, and wherein a mineral oil and the soap component thereof are mixed to form a grease structure before subsequent homogenization, the step which comprises: homogenizing the grease by subjecting the same to a pressure greater than about 500 pounds per square inch, and thereafter suddenly releasing the grease so compressed to a zone of substantially lower pressure by discharge thereof through a restricted orifice, whereupon the soap component is dispersed through said grease in particles of much smaller dimension than before homogenization.

15. In the manufacture of a lime base grease wherein a mineral oil and a lime soap are mixed to form a grease structure before subsequent homogenization, the step which comprises homogenizing a lime soap-containing mixture under a pressure in excess of about 500 pounds per square inch and thereafter suddenly releasing said mixture from confinement of said pressure by discharge thereof through a restricted orifice, whereupon the soap is dispersed throughout said grease in particles of much smaller dimension than before homogenization.

16. In the manufacture of a steam-cooked grease having a grease structure before subsequent homogenization, the improvement which comprises passage of said grease through a high pressure homogenizer at a pressure greater than about 500 pounds per square inch and subsequent release of the grease from said homogenizer by discharge thereof through a restricted orifice, whereupon the thickening agent of said grease is disintegrated into minute particles, which are thoroughly dispersed throughout the grease.

17. A process for manufacturing a lime base grease, which comprises steam-cooking a lime soap and mineral oil to form a soap grease structure before subsequent homogenization, passing the resulting grease mixture into a high pressure homogenizer at a pressure in excess of 500 pounds per square inch and thereafter effecting initmate internal shear of the grease by sudden expulsion thereof from said high pressure through a restricted orifice to substantially atmospheric pressure, whereupon the soap is dispersed throughout said grease in particles of much smaller dimension than before homogenization.

18. In the manufacture of a lubricating grease, the steps which comprise: forming a mixture of an oleaginous vehicle and a thickening agent whose crystalline structure has been established before subsequent homogenization, the thickening agent being present in an amount sufficient to thicken said vehicle to a grease; homogenizing the resulting grease by subjecting the same to a pressure greater than 500 pounds per square inch, and thereafter suddenly releasing the grease so compressed to a zone of substantially lower pressure by discharge thereof through a restricted orifice, whereupon the thickening agent is disintegrated into minute particles, which are thoroughly dispersed throughout the grease.

19. In the manufacture of a lubricating grease, the steps which comprise: forming a mixture of an oleaginous vehicle and a thickening agent whose crystalline structure has been established before subsequent homogenization, the thickening agent being present in an amount sufficient to thicken said vehicle to a grease; homogenizing the resulting grease by subjecting the same to a pressure greater than about 500 pounds per square inch, and thereafter suddenly releasing the grease so compressed to a zone of substantially lower pressure by discharge thereof through a restricted orifice against an impingement surface, whereupon the thickening agent is disintegrated into minute particles, which are thoroughly dispersed throughout the grease.

20. In the manufacture of a lubricating grease, the steps which comprise: forming a mixture of a mineral oil and an organophilic inorganic oxide, the latter being present in an amount sufficient to thicken said oil to a grease; homogenizing the resulting grease by subjecting the same to a pressure greater than about 500 pounds per square inch, and thereafter suddenly releasing the grease so compressed to a zone of substantailly lower pressure by discharge thereof through a restricted orifice, whereupon the oxide thickening agent is disintegrated into minute particles, which are thoroughly dispersed throughout the grease.

References Cited in the file of this patent

UNITED STATES PATENTS

| | | |
|---|---|---|
| 2,433,636 | Thurman | Dec. 30, 1947 |
| 2,483,282 | Houlton | Sept. 27, 1949 |
| 2,599,343 | Morway et al. | June 3, 1952 |
| 2,626,241 | Sparkes et al. | Jan. 20, 1953 |